United States Patent

Hirai et al.

[15] 3,688,876
[45] Sept. 5, 1972

[54] DISC BRAKE OF THE FLOATING TYPE

[72] Inventors: Akiyoshi Hirai, Toyota-shi; Kaname Doi, Ibaragi-shi; Takeshi Noguchi, Nishinomiya-shi, all of Japan

[73] Assignees: Sumitomo Electric Industries, Ltd., Osaka; Toyota Jidosha Kogyo Kabushiki, Toyota-shi, Japan

[22] Filed: Sept. 25, 1972

[21] Appl. No.: 860,963

[30] Foreign Application Priority Data

Oct. 1, 1968 Japan .......................43/71581

[52] U.S. Cl. ..........................188/73.3, F16d/55/224
[58] Field of Search..........188/71.8, 72.4, 73.3, 73.6, 188/196 P

[56] References Cited

UNITED STATES PATENTS

| | | | |
|---|---|---|---|
| 3,199,635 | 8/1965 | Bessler et al. | 188/196 P |
| 3,312,317 | 4/1967 | Hawley et al. | 188/71.8 X |
| 3,374,866 | 3/1968 | Miles | 188/73.3 X |
| 3,487,895 | 1/1970 | Seip | 188/71.8 |
| 3,421,602 | 1/1969 | Craske | 188/73.4 |

*Primary Examiner*—George E. A. Halvosa
*Attorney*—Birch, Swindler, McKie & Beckett

[57] ABSTRACT

This is a disc brake of the floating type particularly adapted for use with motor vehicles. The brake has a fixed member disposed on one side of a rotating disc and having two outwardly extending circumferentially spaced arms, each arm having a pin extending away from the disc in the direction of the axis of rotation of the disc. A floating member straddles the disc, and includes a pair of mutually opposed friction members for engaging the disc and an actuator therefor. The floating member further has a pair of bores for engaging the pins such that the floating member is slidable on the pins. The fixed member is provided with a shoulder engaging one of the friction members for receiving the braking torque therefrom, and the braking torque from the other of the friction members is received by the floating member and is passed to the fixed member through one of the pins. There is a predetermined clearance between each of the bores and its associated pin, and the pin that receives the torque from such other friction member has less clearance with its bore than the other pin.

6 Claims, 5 Drawing Figures

EXTENT OF DISPLACEMENT OF INNER FLOATING SECTION UPON BRAKING ACTUATION

DISC BRAKE OF THE FLOATING TYPE

This invention relates to disc brake of the floating type, and more particularly the invention deals with an improved disc brake which comprises a fixed member disposed on one side of a rotating disc or on a side nearer to the longitudinal center axis of a vehicle (hereinafter referred to as an "inner side"), said fixed member being of U-shape and having an opening directed diametrically of the disc and two arms, two parallel pins being connected to said fixed member each at one of said arms or near the base thereof and extending away from the disc in the direction of axis of rotation of the disc, and a floating member formed with pin receiving bores each for receiving one of said pins therein whereby the floating member can move in floating motion relative to said pins.

At least one pair of friction elements are disposed on opposite sides of the rotating disc for frictionally gripping the rotating disc to thereby apply the brake. One of the friction elements which is disposed on a side (inner side) of the fixed member is caused to press against one side of the rotating disc by a pressing mechanism formed integrally with the floating member. The other friction element which is disposed opposite said friction element with respect to the disc or on a side remote from the longitudinal center axis of the vehicle (hereinafter referred to as an "outer side") is pulled, together with the floating member, toward the inner friction element by a force produced as a reaction to the pressing force exerted by the pressing mechanism on the inner friction element so as to press against other side of the disc and frictionally grip the same.

A portion of the braking torque acting on the outer friction element as the brake is applied is transmitted through the floating member to the pins connected to the fixed member and borne thereby. In the present invention, however, the torque is mostly absorbed by that pin connected to that arm of the U-shaped fixed member which is disposed on a leading side of the rotating disc, with the pin disposed on a trailing side not being substantially concerned in bearing the torque. On the other hand, the inner friction element is mounted in the recess of the U-shaped fixed member and a portion of the braking torque acting on the inner friction element is borne by a side of that arm of the fixed member which is disposed on the outward rotation side of the disc. Accordingly, the braking torque acting on the two friction elements are distributed to and absorbed by the two arms of the U-shaped member. It will thus be appreciated that the present invention provides a design of an ideal fixed member for logically bearing a high braking torque.

Another feature of the present invention lies in the combination of a pair of pins with bores for receiving the pins therein, the clearance between the outer circumferential surface of the pin and the side wall of the pin-receiving bore on the leading side of the disc is minimized so that the pin may be maintained in intimate contact with the side wall of the pin-receiving bore while moving in sliding motion in the bore, while the clearance between the outer circumferential surface of the pin and the side wall of the bore on the trailing side of the disc is made greater than the said clearance, so that the pair of pins can readily be received in the pair of bores in fitting the pins in the bores. Thus, the need for high accuracy and precision in machining operation to align the pins with the bores can be eliminated.

Another feature of the invention lies in the fact that resilient means is mounted in the clearance between the outer circumferential surface of the pin and the side wall of the pin receiving bore on the outward rotation side of the disc to fill a part of the gap. The pitch of the two pins are slightly smaller than the pitch of the two pin receiving bores formed in the floating member for receiving the respective pins therein. This arrangement offers an advantage in that the resilient force produced by said resilient means permits the outer circumferential surface of the pin on the leading side of the disc, and the side wall surface of the associated bore, particularly the portions of these surfaces which are disposed on the trailing side of the disc, to be brought into intimate contact with each other without any gap being left therebetween, whereby the production of a noise of impact caused by the sudden action of the braking torque in the initial stages of applying the brake can be prevented.

Said resilient means undergoes resilient deformation as the floating member and hence the pin-receiving bores are moved away from the disc by a force produced as a reaction to the pressing force exerted by the pressing mechanism when the brake is applied. When the braking or pressing force is released, the resilient means is restored to its original form and simultaneously with this resilient restoration of the resilient means, a gap of suitable amount is produced between the friction surface of the outer friction element and the side of the disc. This offers an advantage in that squeakes that would otherwise occur when the brake is not applied can be prevented. An additional advantage is that this can prevent undesirable shaking of the floating member that would otherwise be caused by vibrations of the car body when the disc brake according to this invention has application in motor vehicles.

Still another feature of the present invention lies in the fact that the floating member is moved away from the disc in a stable manner when fluid under pressure used for applying the brake is removed so as to thereby permitting to maintain the gap between the outer friction element and the disc at an optimum level. Undesirable rubbing movements would otherwise occur between the outer friction element and the disc when the distance covered by the floating member in moving away from the disc is too small; and the amount of fluid under pressure required for applying the brake next time would otherwise be increased when the distance covered by the floating member in moving away from the disc is too great. The present invention offers an advantage in that the aforementioned disadvantages of the prior art disc brake devices can be obviated.

Still another feature of the present invention lies in the provision of an opening in that portion of the floating member which straddles the disc. This offers an advantage in that access can be had to the friction elements through said opening, so that the friction elements can be readily removed and replaced by new ones when necessary.

Still another feature of the present invention lies in the fact that the floating member enclosing said opening is in the form of a loop. This offers an advantage in that the disc brake provided by this invention can withstand the strain energy of the braking torque or the like, with the deformation of the floating member caused by the braking torque being minimized and the quantity of fluid under pressure required for applying the brake also being minimized.

A further feature of the present invention lies in the fact that the floating member consists of two sections arranged in side by side relation in the direction of axis of rotation of the disc and connected together by fastening means such as bolts. This arrangement offers an advantage in that machining of that section of the floating member which is formed integrally with the pressing mechanism is facilitated when the disc brake of this invention is manufactured. Moreover, this arrangement permits the bending load applied to the floating member to be divided and borne equally by the fastening bolts.

Additional features and advantages of the present invention are evident from the description of an embodiment set forth hereinafter when considered in conjunction with the accompanying drawings. It should be understood, however, that the invention is limited to the specific details of the embodiment, and that many changes and modifications may be made therein without departing from the spirit and scope of the invention. The embodiment described herein represents an application of the present invention to motor vehicles.

Figure 4A:
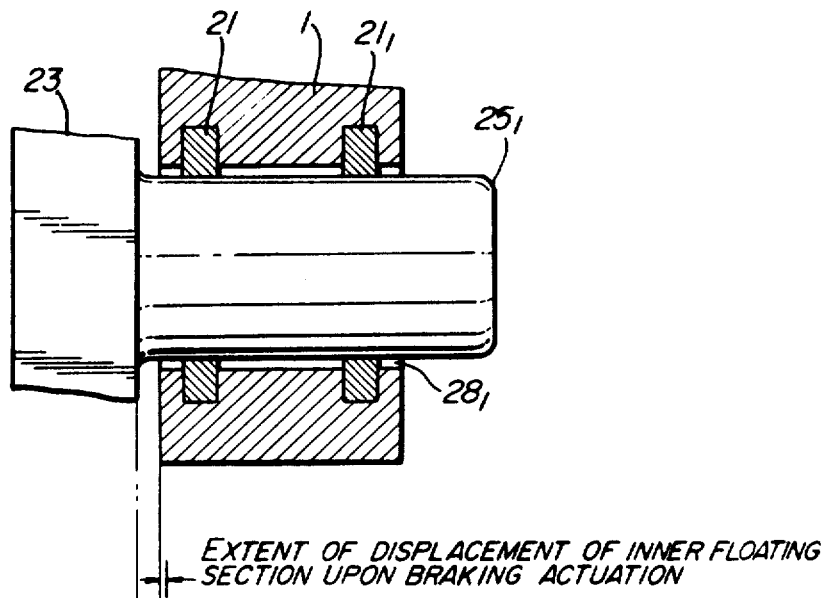
Figure 4B:
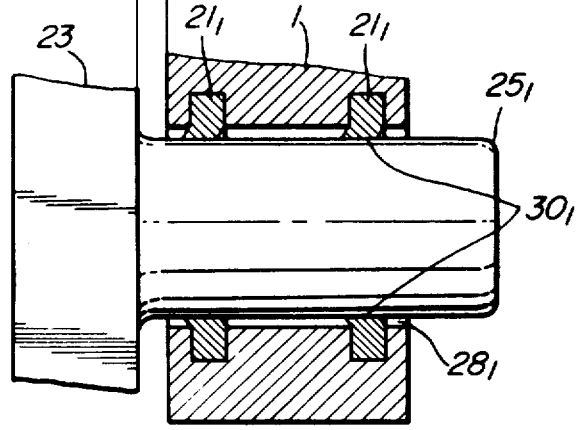

FIGS. 4a and 4b show in detail the manner in which the floating member is slidably supported by the pin connected to the fixed member, FIG. 4a showing the floating member and the pin when no braking force is applied and FIG. 4b showing the floating member and the pin when the braking force is applied, with the resilient means mounted between the side wall of the pin receiving bore formed in the floating member and the outer circumferential surface of the pin undergoing resilient deformation.

Figure 1:
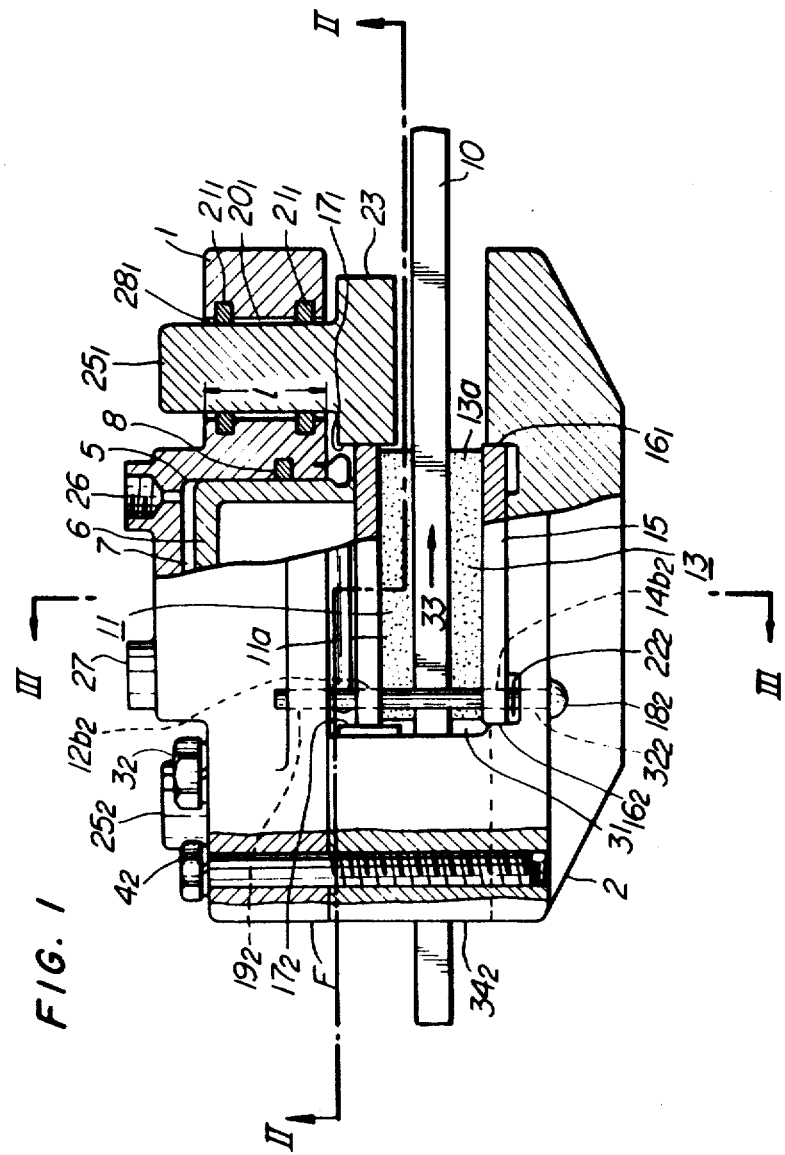
FIG. 1 is a schematic plan view of one embodiment of this invention, with certain parts being shown in section.
Figure 2:
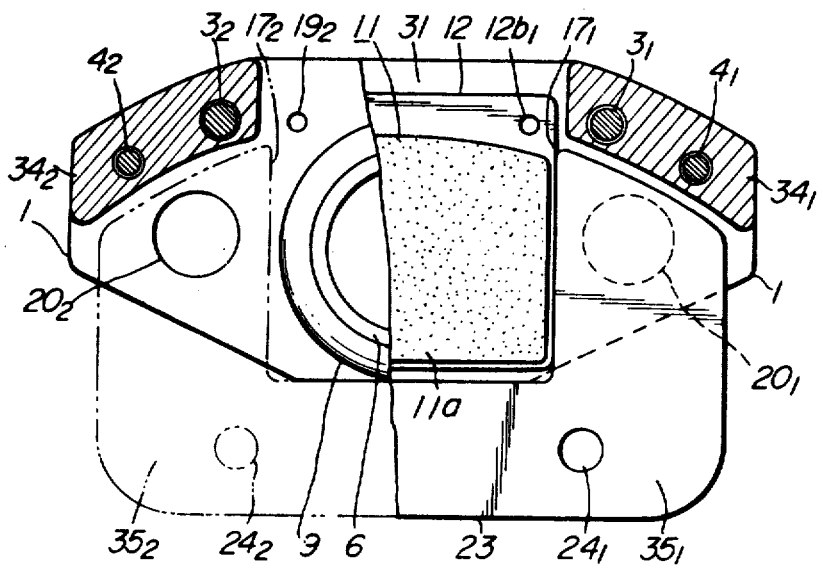
FIG. 2 is a sectional view taken on the line II—II of FIG. 1, and seen in the direction of arrows with certain parts being shown in section.
Figure 3:
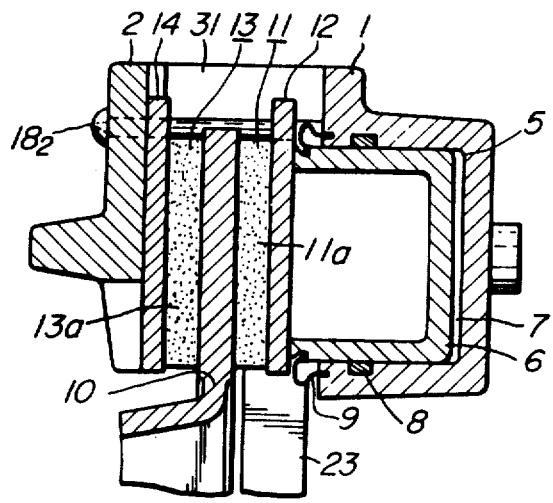
FIG. 3 is a sectional view taken on the line III—III of FIG. 1, and seen in the direction of arrows.

It is noted that the structure of the disc brake of this invention shown in FIG. 1 is substantially symmetrical with reference to the vertical center line thereof (not shown) to form the left area and the right area. Some members and portions of the structure in the right area are represented by reference numerals having small suffix 1 and in the left area by reference numerals having small suffix 2, whereas the location of some members or portions invisible in the drawings can be traced with reference to the members or portions in the opposite area which are visible in the drawings and have the small suffix either 1 or 2.

Reference numeral 1 designates an operational mechanism (hereinafter, called an "inner floating section") which comprises a piston 6, a cylinder 5, a seal 8 for sealing the hydraulic fluid in the cylinder and fitted in a sealing groove provided on the inner peripheral wall of the cylinder 5, a hydraulic fluid chamber 7 included by these members a hydraulic fluid inlet port 26 and air outlet port 27 disposed on the wall of said cylinder 5 respectively, pin receiving bores $20_1$, $20_2$ for the engagement with pins integrally mounted on a fixed member, and a dust cover 9 of elastic material which spans from the lip portion of said cylinder 5 to a portion on the outer peripheral wall of said piston 6. On the other hand, an outer floating section 2 has an opening 31 through which inner and outer friction elements 11, 13 disposed on the opposite sides of a rotating disc respectively are accommodated, and includes the pressing surface 15 effective in pressing the outer friction element 13 against the disc upon actuation of the braking action, and outer friction element supporting side walls $16_1$, $16_2$ for receiving and transmitting the torque produced by actuation of the braking action.

The inner and outer floating sections are held rigid with respect to each other by means of inside bridge bolts $3_1$, $3_2$ and outside bridge bolts $4_1$, $4_2$ to form a floating member F. On the contrary, the fixed member 23 secured to the stational portion of the vehicle by means of bolts or the like (not shown) through bores $24_1$, $24_2$ and positioned at the inside of the wheel adjacent to the disc rotatable together with the wheel, includes inner friction element supporting side walls $17_1$, $17_2$ effective in slidably supporting the inner friction element 11 in the axial direction of the cylinder, the opening transversely disposed relative to the axis of the disc 10 for permitting the mounting and demounting of the inner friction element 11, and two parallel pins $25_1$, $25_2$ extending inside the vehicle at the respective positions spaced by said opening.

The pin receiving bores $20_1$, $20_2$ of circular cross-section formed in the inner floating section for slidably receiving therein the parallel pins $25_1$, $25_2$ of the fixed member 23 are so disposed that the pitch of the pin receiving bores is substantially equal to the pitch of the parallel pins. The pin-receiving bores $20_1$, $20_2$ are disposed on opposite sides of the cylinder 5 in parallel relation to the longitudinal axis of the cylinder 5 with the cylinder disposed therebetween. The pins $25_1$, $25_2$ are fitted in the pin-receiving bores $20_1$, $20_2$ respectively for sliding motion therewith, with clearances, such as 28, being disposed between the side walls of the bores and the outer circumferential surfaces of the pins.

Furthermore, a desired number of pieces of elastic material, such as 21, are fittably provided in the pin-receiving bores $20_1$, $20_2$ respectively to ensure the close fitting of these parallel pins $25_1$, $25_2$ in the respective bores $20_1$, $20_2$.

The inner friction element 11 consists of a friction liner 11a and a backing plate 12 rigidly jointed with the friction liner, and the outer friction element 13 consists of a friction liner 13a and a backing plate 14 rigidly jointed with the friction liner. These frictional elements are disposed opposite each other with respect to the disc 10, and the inner friction element 11 is adapted to be directly pressed by the piston 6 of the pressing mechanism against the associated inner surface of the disc 10 to frictionally engage therewith while the outer friction element 13 is operatively connected to the pressing mechanism through the floating member F and is adapted to be engaged by the pressing surface 15 of the outer floating section 2 so as to be pressed against the associated outer surface of the disc 10 to frictionally engage therewith.

The backing plates 12, 14 of the friction elements are provided with bores $12b_1$, $12b_2$ and $14b_1$, $14b_2$ respectively. The friction elements 11, 13 interposed between the inner and outer floating sections 1, 2 are slidably supported by a pair of pins $18_1$, $18_2$ which pass through the aforesaid bores $12b_1$, $12b_2$ and $14b_1$, $14b_2$ respectively and extend between these floating sections with each one end of these pins being received in pin-receiving bores $19_1$, $19_2$ provided in the inner floating section 1 respectively and the other ends being received in pin-receiving bores $32_1$, $32_2$ provided in the outer floating section 2 respectively, and are secured to the floating member F by means of split pins $22_1$, $22_2$ respectively.

The inner friction element 11 is fittably received between the side walls $17_1$, $17_2$ of the fixed member 23 with very small spaces being provided between these side walls and the associated side surfaces of the backing plate 12 of the inner friction element, and the outer friction element 13 is fittably received between the side walls $16_1$, $16_2$ of the outer floating section 2 with very small spaces being disposed between these side walls and the associated side surfaces of the backing plate 14 of the outer friction element, so that the torque produced when the braking action is applied can be positively received by these side walls $17_1$, $17_2$ and $16_1$, $16_2$ regardless of the rotational direction of the disc 10.

If the rotational direction of the disc when the vehicle runs forwards is indicated by the arrow 33 in FIG. 1, the clearance defined between the pin $25_2$ and the pin receiving bore $20_2$ on the inward rotation side of the disc is determined to have a very small value whereas the clearance $28_1$ defined between the pin $25_1$ and the pin-receiving bore $20_1$ on the outward rotation side of the disc is determined to have a larger value. This produces good results that the torque produced upon the actuation of the braking action can be advantageously received as will be described later and also the restrictions to the allowance of dimension in the pitch of the parallel pins $25_1$, $25_2$ and the pin-receiving bores holes $20_1$, $20_2$ can be relaxed, and thus the manufacturing process thereof is profitably performed.

When hydraulic fluid is introduced into the fluid chamber 7 through the inlet port 26 while the air outlet port 27 is closed by a plug (not shown), the piston commences to press the inner friction element 11 against the associated friction surface of the disc 10 through the backing plate 12 while the inner floating section 1 reacts to move away from the inner surface of said disc to press the outer friction element 13 against the associated friction surface of the disc 10 through the backing plate 14 engaged by the pressing surface 15 of the outer floating section 2 secured rigid with the inner floating section 1 by means of bridge bolts $3_1$, $3_2$, $4_1$ and $4_2$. The pressing force effective to cause the friction elements to nip both surfaces of the disc is supported through the floating member F, especially, arms $34_1$, $34_2$ of the outer floating section 2.

Generally, floating members of disc brake of the floating type have a complicated form and they are in general formed by casting. For this reason, in order to provide sufficient strength and minimum strain against the external forces acting on said arms $34_1$, $34_2$, it is necessary for the thickness, weight, and dimensions of said arms to be increased. Furthermore, this influences the braking efficiency, suspension capacity, and other functional factors. On the contrary, the brake of this invention is designed in such a manner that the inside bridge bolts $3_1$, $3_2$ and the outside bridge bolts $4_1$, $4_2$ made of material having a tensile strength are employed to connect the floating sections by clamping the respective arms at the positions adjacent to the center of the pressing force so that the pressing force applied can be effectively shared by the arms $34_1$, $34_2$ formed by casting and said bridge bolts, resulting in the elimination of the defect mentioned above.

The parallel pins $25_1$, $25_2$ disposed on the fixed member to support the floating member F as in the preceding description are respectively arranged towards the inside of the vehicle so that without being interfered by the rotatable body such as wheel, the length of their pins along which the pin receiving bores $20_1$, $20_2$ are slidably engaged with the associated pins can be possibly maintained at a sufficient value relative to the diameter of each of the parallel pins. Furthermore, as previously described, since the clearance formed between the pin $25_2$ and the pin-receiving bore $20_2$ is very small while the clearance $28_1$ formed between the pin $25_1$ and the pin receiving bore $20_1$ is considerably larger, the principal and the secondary guidances of the movement of the floating member F in the direction parallel to the axis of the disc are stably performed between the bore $20_2$ and the associated pin $25_2$ and the bore $20_1$ and the associated $25_1$ respectively, without being effected by the pitch error and the error of parallelism in connection with the manufacturing technique. In addition to the above the elestic members $21_1$, $21_2$ interposed between the parallel pins and the associated pin-receiving bores are effective in improving the function thereof.

The elestic members $21_1$, $21_2$ accommodated in the pin-receiving bores $20_1$, $20_2$ to clamp the respective parallel pins $25_1$, $25_2$ as shown in FIG. 4a which only one side thereof is shown, are deformed due to relative displacement of each pin and each pin-receiving bore upon actuation of the braking action as shown by reference numeral $30_1$ in FIG. 4b, and are effective to restore from the displacement of the floating member F by means of the restoring force of t-e elastic members when the braking action is released. In case the relative displacement is caused between the pin-receiving bores and the associated pins beyond the limit of deformability of the elastic members $21_1$, $21_2$, sliding takes place between said elastic members and said pins so as to maintain the magnitude of restoration from the displacement of the floating member F within a predetermined value depending upon the amount of the wear of the outer friction element 18, to thereby maintain the clearance between the outer friction element 18 and the friction surface of the disc 10 within the predetermined range.

As is well known, the fluid seal 8 in the pressing mechanism also performs the same function as the elastic members $21_1$, $21_2$. When the relative displacement is caused between the piston 6 and the cylinder 5 after hydraulic fluid is introduced into the fluid chamber 7, the fluid seal 8 deforms due to said displacement and the application of the hydraulic fluid, in the similar manner as the deformation $30_1$ of the elastic member 21 shown in FIG. 4b, and the piston is restored to its original position from the displacement by the restoring force when the hydraulic pressure is reduced. In case the wear of the inner friction element 11 has exceeded a predetermined amount, sliding takes place between the piston 6 and the fluid seal 8 since the amount of deformation of the seal exceeds over the allowance thereof, the magnitude of restoration of the piston 6 by the fluid seal 8 is maintained within the predetermined range. This function is effective in maintaining within the predetermined range the clearance between the inner friction element 11 and the associated friction surface of the disc 10.

As is apparent from FIG. 1, it is preferable that the characteristics of the elastic members $21_1$, $21_2$, the surface roughness of the parallel pins, and the clamping force between the elastic members and the parallel pins are selected so that the restoring force of the elastic member $21_1$, $21_2$ with regard to the floating member F may be half the restoring force of the fluid seal 8 with regard to the piston 6, and also the absolute value must be determined with regard to the restoration capacity of either said fluid seal 8 and said elastic members $21_1$, $21_2$ so that each clearance between each of the friction elements and the associated friction surface of the disc may be maintained within the preferred range when the braking force is released.

The clamping force of each of said elastic member $21_1$, $21_2$ ensures retaining of the floating member to the fixed member and also restriction of the free movement thereof under the external conditions other than the braking operation.

When the braking action takes place while the vehicle runs forwards, that is, the disc rotates in the direction as indicated by the arrow 33 in FIG. 1, the torque produced thereby on the inner friction element 11 may be transmitted through the backing plate 12 to the torque receiving side wall $17_1$ disposed on the fixed member to be received by the root portion $35_1$ of the arms of the U-shaped fixed member and then absorbed by the nonrotatable portion of the vehicle to which the fixed member is secured. On the other hand, the torque produced on the outer friction element 13 may be transmitted through the backing plate 14 to the torque receiving side wall $16_1$ disposed on the outer floating section 2, and then transmitted through the floating member F to the parallel pins $25_1$, $25_2$ of the fixed member. As previously described, since the clearance $28_2$ between the pin $25_2$ and pin-receiving bore $20_2$ is determined so smaller than the clearance $28_1$ between the pin $25_1$ and the pin-receiving bore $20_1$, the torque produced on the outer friction element 13 may be then transmitted to the pin $25_2$ to be supported by the root portion $35_2$ of the arms of the U-shaped fixed member, and then absorbed by the non-rotatable portion of the vehicle to which the fixed member is secured. In other words, this assures that the torque produced on both friction elements in the forward running of the vehicle under which conditions the considerable torque may be produced upon actuation of the braking action, may be possibly dispersed and transmitted to the fixed member. On the other hand, the torque produced on both friction elements upon the braking action in the backward running of the vehicle may be concentrated and be transmitted to the root portion $35_2$ of the arm $34_2$, but since the torque thus produced is relatively small this does not bring any problems in respect to the strength of the root portion $35_2$ of the arm even if the torque concentrates only thereon. As the result of the above the fixed member 23 can be formed with a restricted amount of material into the U-shaped structure which has the opening on the upper portion thereof.

In a disc brake of the floating type having such construction as mentioned above, the production of the torque causes a noise produced due to the impact of the metallic members at the engaging portion between the floating member and the fixed member, this giving an unpleasant feeling. The elastic members $21_1$, $21_2$ having the cushion effect will prevents the aforesaid noise from occurring and serves the performance of a smooth operation of the vehicle.

The shape of and manner of retaining the elastic members shown in FIGS. 1 and 4a are only for illustration. Therefore, it should be understood that the principal matter with reference to the elastic members is to determine the shape of and manner of retaining the elastric members $21_2$ so that the pin $25_2$ is fitted in the associated pin-receiving bore $20_2$ in direct contact relation therewith to thereby receive a portion of the braking torque transmitted to the outer floating member F through the outer friction element 13 when the vehicle runs forward, while determining the shape of the elastic members $21_1$ so as to fully seal the clearance $28_1$, whereby the aforesaid noise produced by the impact between the metallic members can be absorbed.

What we claim is:

1. A disc brake of the floating type comprising a rotatable brake disc having friction surfaces on opposite sides thereof, a fixed member for receiving the torque generated when the brake is actuated, said fixed member having first and second outwardly extending arms circumferentially spaced from one another around the axis of said disc and facing one of said friction surfaces, first and second pins mounted respectively on said first and second arms and extending outwardly therefrom substantially parallel to the axis of said disc, a floating member straddling said disc, an inner friction member which is located between said first and second arms and an outer friction member which is carried by said floating member in opposed relationship to said inner friction member for engaging said disc therebetween, actuator means carried by said floating member for moving said friction members into engagement with said disc, first and second bores in said floating member substantially parallel to the axis of said disc for engaging said first pin and said second pin respectively, said bores having diameters greater than the diameters of said respective pins to provide a radial clearance therebetween, said radial clearance between said first bore and said first pin being less than said radial clearance between said second bore and second pin, so that substantially all of the torque from said outer friction member is received by said first arm through said first pin during forward and backward running of said disc.

2. A disc brake according to claim 1 wherein resilient means is disposed in said clearance between said second bore and said second pin.

3. A disc brake according to claim 1 wherein said floating member has an opening disposed radially outwardly of said disc for permitting interchange of said friction members therethrough, said floating member being is the form of a loop surrounding said opening.

4. A disc brake according to claim 1 wherein said first pin is integral with said fixed member.

5. A disc brake as set forth in claim 1 wherein said first arm is the leading arm with respect to the direction of rotation of said disc under the forward running of the vehicle.

6. A disc brake according to claim 1 wherein said second arm directly engages said inner friction member for directly receiving all of the torque therefrom and said floating member directly engages said outer friction member for receiving all of the torque therefrom.

* * * * *

UNITED STATES PATENT OFFICE
CERTIFICATE OF CORRECTION

Patent No. 3,688,876　　　　　　　　Dated September 5, 1972

Inventor(s) AKIYOSHI HIRAI, KANAME DOI AND TAKESHI NOGUCHI

It is certified that error appears in the above-identified patent and that said Letters Patent are hereby corrected as shown below:

The first assignee should read --Sumitomo-- instead of "Sumitoma".

The filing date of the application should read --September 25, 1969-- instead of "September 25, 1972".

In column 3, line 27, "the invention is limited" should read --the invention is not limited--.

In column 6, line 51, "t-e" should read --the--.

In claim 3, line 5, "being is the form" should read --being in the form--.

Signed and sealed this 3rd day of April 1973.

(SEAL)
Attest:

EDWARD M. FLETCHER, JR.　　　　　　　ROBERT GOTTSCHALK
Attesting Officer　　　　　　　　　　Commissioner of Patents